Oct. 18, 1955
E. A. RICE
2,720,724
AQUATIC FIGURE TOY
Filed April 5, 1954
2 Sheets-Sheet 1
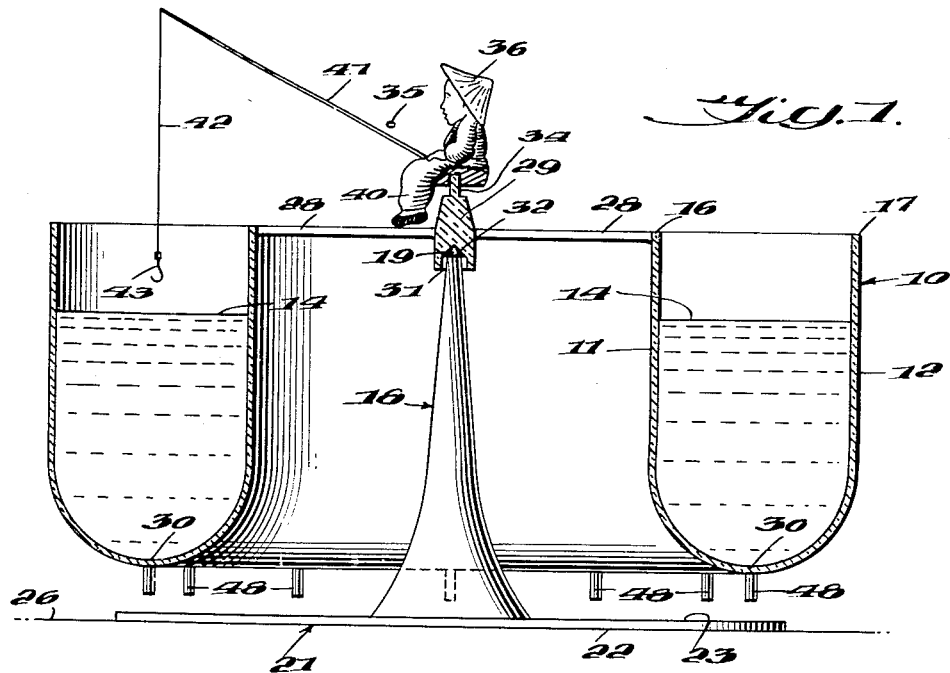
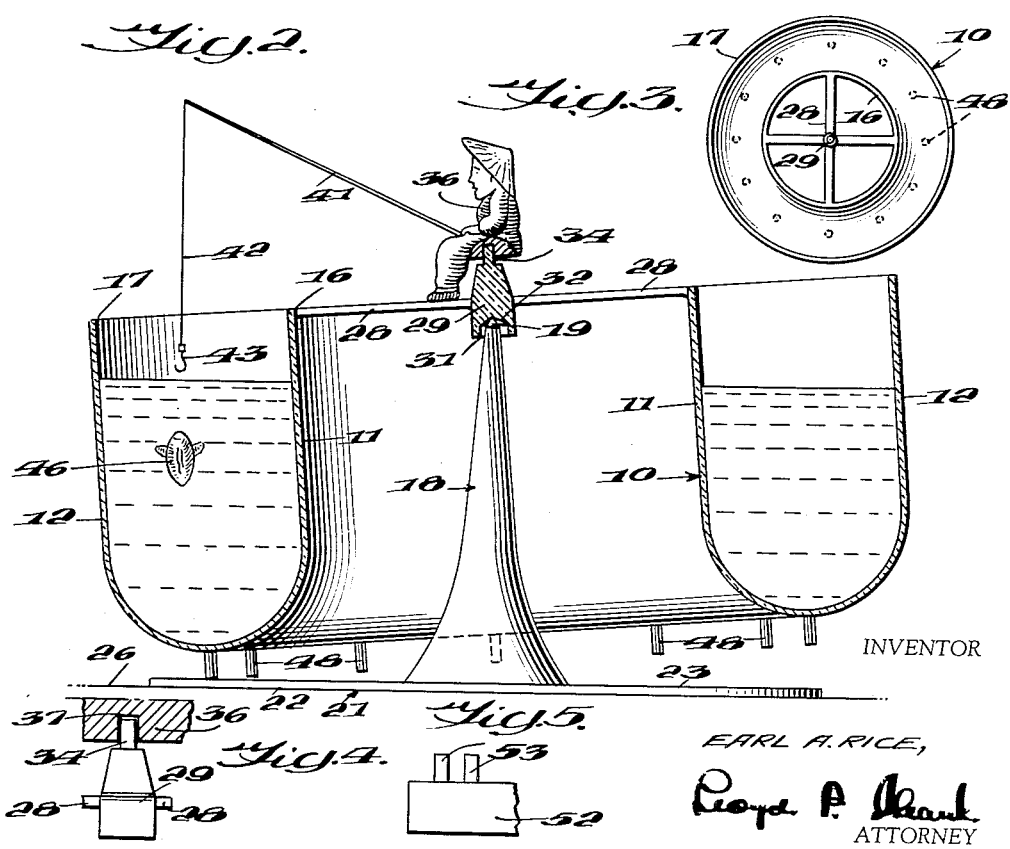
INVENTOR
EARL A. RICE,
ATTORNEY Oct. 18, 1955
E. A. RICE
2,720,724
AQUATIC FIGURE TOY
Filed April 5, 1954
2 Sheets-Sheet 2
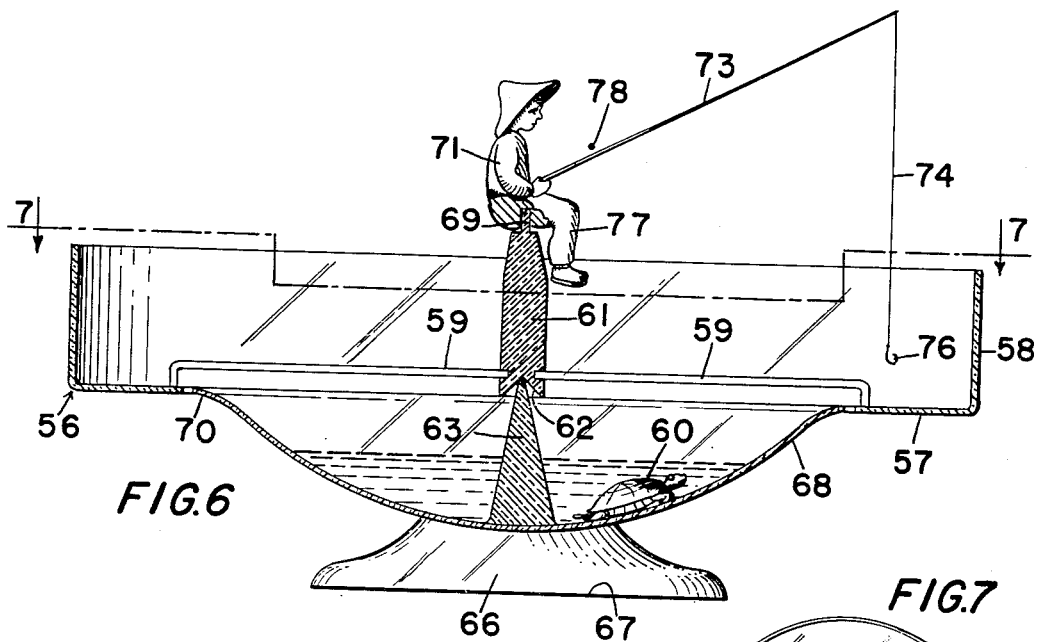
FIG.6
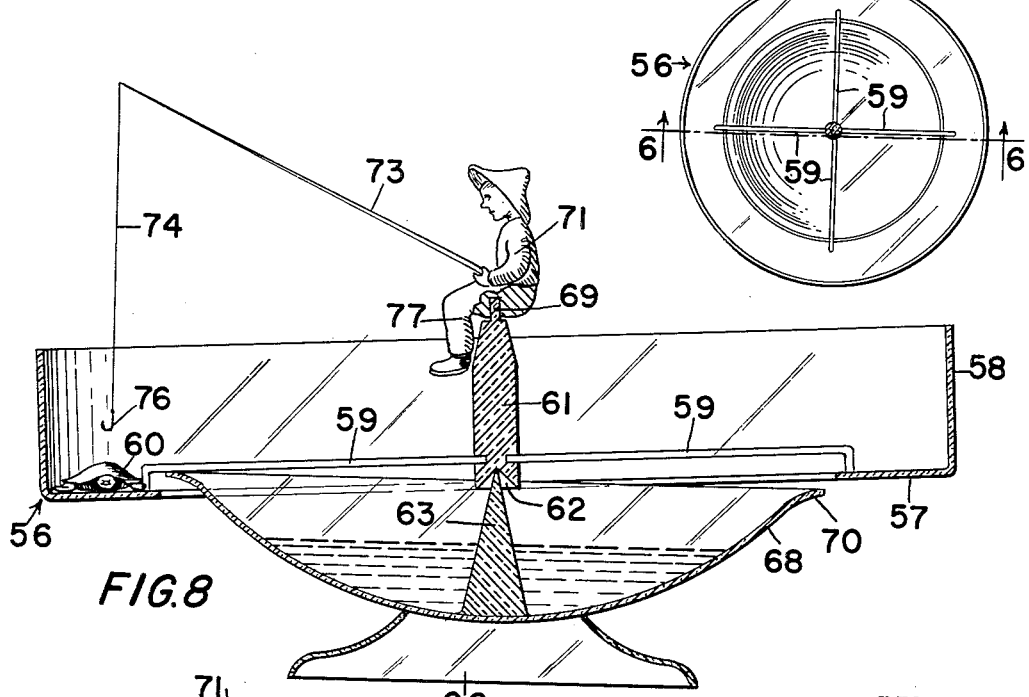
FIG.7
FIG.8
FIG.9
INVENTOR
EARL A. RICE
BY
ATTORNEY United States Patent Office 2,720,724
Patented Oct. 18, 1955

2,720,724

AQUATIC FIGURE TOY

Earl A. Rice, Mercersburg, Pa.

Application April 5, 1954, Serial No. 420,914

6 Claims. (Cl. 46—92)

The present invention relates generally to aquariums in association with an amusement device and more specifically pertains to such an assembly wherein an annular member is supported to tilt in response to the weight of an aquatic animal or creature such as a fish, turtle or similar specimen on or within the annular member and thereby tilt a structure resembling an individual fisherman so that a pole, line and hook held by the fisherman will follow movements of the aquatic creature in movements around the annular member. This application is a continuation-in-part of my application Serial No. 291,740, filed June 4, 1952, now abandoned.

An object of the invention is to provide an aquarium so constructed and supported that a fish swimming therein will cause the receptacle to become unbalanced and move downwardly slightly from a horizontal balanced position and to utilize such tipping movements of the aquarium for imparting movements to a fisherman element so that a hook and line supported by the fisherman will be maintained adjacent the fish and follow its movements in the aquarium.

Another object of the invention is to support a ring-shaped trough at the center thereof so that water within the trough will normally cause the trough to assume a horizontal balanced position whereby a fish swimming in the water will add weight to the circumferential portion in which the fish is swimming to cause one arcuate portion of the trough to move downwardly to a limited extent whereby the fisherman will turn to positions taken by the fish.

A still further object of the invention is to provide an annular member supported at its center on a point shaped stem so that the annular member may tilt on its support in response to the weight of a turtle or other aquatic creature or animal and to provide such a support for the fisherman element that it will turn to positions taken by the aquatic specimen to provide the illusion of efforts to snare the creature on a hook.

Other objects and features of the invention will be apparent as the present disclosure proceeds and upon consideration of the following detailed description and the annexed drawing wherein several embodiments of the invention are disclosed.

In the drawings:

Fig. 1 is an elevational view of an aquarium embodying the invention with the trough and other portions shown in section.

Fig. 2 is a similar view showing the aquarium in a tilted position.

Fig. 3 is a plan view on a reduced scale with the element representing a fisherman omitted.

Fig. 4 is a side elevation of the bearing member showing the character of the support for the fisherman.

Fig. 5 is a fragmentary side elevation of a modification.

Fig. 6 is a sectional view of another embodiment taken on the line 6—6 of Fig. 7.

Fig. 7 is a sectional plan view on a reduced scale taken on the line 7—7 of Fig. 6.

Fig. 8 is a view similar to Fig. 6 showing a tilted position of the annular member.

Fig. 9 is a fragmentary sectional view illustrating the support of the fisherman element.

The invention is directed to a combination of aquariums and an amusement device for accommodating at least one aquatic animal and one part of the organization comprises an annular member so constructed and mounted as to tilt downwardly in response to the weight of a fish or turtle or the like. An element representing a fisherman holding a pole with a hook and line thereon is mounted to turn on its support so that the fisherman will swing in response to tilting of the annular member whereby the pole and the line follow circumferential movements of the aquatic creature while supported on or in the annular member. The arrangement thus provides the illusion of the fisherman attempting to snare or catch the aquatic animal as it moves circumferentially of the annular member.

Referring to the drawings there is shown in Figs. 1 to 4 an annular or ring-shaped trough member 10 formed of transparent material such as glass or plastic. The trough forms a complete circle as will be evident upon consideration of Fig. 3. The trough serves as a receptacle for water and may be of any shape in cross section. In the embodiment illustrated the trough or annular member is U-shaped in section as shown in Fig. 1. The trough is adapted to tilt as hereinafter described and it is therefore desirable that the side walls 11 and 12 have rather extended dimensions measured vertically to prevent spilling of the liquid from the trough. The water in the trough normally has a level as indicated at 14 in Fig. 1 which is spaced appreciably below the upper edges 16 and 17 of the side walls 11 and 12.

The annular trough-shaped receptacle is supported so that it may tilt. Any suitable means may be employed to provide such results and in the embodiment shown in the drawings a centrally located upright stem 18 is provided for this purpose. The stem may be formed of any suitable material and is provided with a pointed conical shaped upper end 19. The stem 18 may be formed integral with a base member 21 of disc-shape and having a relatively large diameter. The under surface 22 of the base member is flat and preferably parallel with an upper surface 23. The base member is designed to rest on a substantially flat horizontal supporting surface 26.

The annular trough with water therein is supported at its center of gravity on the pointed end of the stem 18. One arrangement for carrying out such objects includes a plurality of radially disposed arms 28 connected at their outer ends to the inner wall 11 of the trough preferably near the top edge 16. The inner ends of the arms 28 are connected to a bearing member 29. This bearing member has a relatively large cylindrical shaped cavity 31 in the lower portion thereof and of larger diameter than adjacent portions of the stem 18. A conical surface 32 is formed in the bearing member 29 above the cylindrical cavity 31. The apex angle of the conical surface 32 is slightly greater than the corresponding angle of the conical surface 19 on the upper end of the stem 18. Thus the aquarium trough is supported by the pointed end of the conical surface 19. Under such circumstances the trough assumes a level position as shown in Fig. 1 and the water is equally distributed around the circumference of the aquarium. The level of the liquid with respect to the bottom 30 of the trough is thus the same in all circumferential portions of the balanced receptacle.

The bearing member 29 carries a cylindrical shaped pin 34 which extends upwardly therefrom in alignment with the axis of the bearing member. An element representing a human being in a sitting position is shown at 36. A cylindrical shaped opening 37 is provided in the element 36 for receiving and supporting the fisherman on the pine 34. The fisherman element 36 fits snugly on the pin 34 but is free to rotate thereon. An elongated rod 41 is supported at its inner end by the element 36 so that the appearance is provided of the fisherman holding a fishing pole. A flexible line 42 is secured at its upper end to the free end of the pole 41 and carries a hook 43 at the lower end thereof. The legs 40 of the fisherman and the pole 41 including the line 42 and the hook 43 are disposed laterally of the pin 34 so that the center of gravity of the fisherman and associated parts is in the vicinity of the point 35 in Fig. 1. The fisherman and parts thereby are of light weight in relation to the weight of the aquarium and the water in the trough and center of gravity is near the axis of the pin 34 so that in the absence of a fish in the trough the aquarium assumes a substantially level position illustrated in Fig. 1. Accordingly the pin 34 is in a substantially vertical position and the fisherman remains in the position shown in Fig. 1.

In carrying out the invention an aquatic creature such as a gold fish 46 is arranged within the trough so that the fish may swim in the water. In one embodiment the trough has a transverse width between the side walls 11 and 12 of about two and one-half inches and the fish under such circumstances has a length of about three inches. The fish 46 is free to swim around the annular trough. The weight of the fish is greater than the water displaced by its body. The water displaced by the fish 46 assumes a level condition throughout the circumference of the aquarium. Since the fish weighs more than the water it displaces it starts to sink to the bottom of the trough. If the fish moves downwardly and rests on the bottom of the trough the weight thereof in excess of the weight of the water displaced is transmitted to the bottom of the trough. The peripheral portion of the annular member 10 where the fish is located at one instant accordingly moves downwardly and assumes a position as shown in Fig. 3. The fisherman represented at 36 is accordingly tilted in the same direction as the aquarium because the pin 34 tilts with the trough structure. The fisherman 36 then turns on the pin 34 until the center of gravity 35 arrives in the lowermost position and accordingly faces the fish. The pole 41 swings with the element 36 and the hook 43 is thereby positioned over the fish 46. The fish in sinking towards the bottom of the trough sets up friction in the water and the resulting forces are transmitted to the bottom of the trough under the fish. The fish in order to avoid sinking to the bottom of the trough exerts body movements which provides turbulence in the water and such forces are transmitted through the water to an adjacent portion of the trough. These forces are sufficient to tip the trough structure because of the point like support provided by the upper end 19 of the stem 18.

As the fish 46 moves around the annular trough to another position the hook 43 moves with the tilting of the aquarium. If the arrangement of the parts as shown in Fig. 3 is regarded with the fish being in a nine o'clock position then as the fish moves to a twelve o'clock position a corresponding portion of the trough will move downwardly. The lateral disposition of the center of gravity of the fisherman 36 then causes the fisherman 36 to turn on the pintle pin 34. The pole 41 being rigidly carried by the fisherman then swings the line 42 and the hook 43 to a twelve o'clock position over the fish 46. Thus annular movements of the fish cause different circumferential portions of the trough to move downwardly and the fisherman including his pole will move with the fish to provide an illusion of animation depicting efforts being made to snare the fish on the hook 43.

The invention includes means for limiting the tilting movements of the ring-shaped trough. A plurality of elements or lugs 48 may be secured to or formed integral with the bottom of the trough as shown in Figs. 1 to 3. The lugs 48 depend from the trough at substantially equally spaced points. These lugs engage the upper surface 23 of the base member and limit the downward swinging of the aquarium. It will be observed that the trough is supported above its center of gravity because the point 19 at the upper end of the stem 18 is at all times above the center of the mass. The lugs may be formed integral with or carried by the base member. In Fig. 5 a peripheral portion of such a base member is shown at 52. A plurality of lugs 53 are arranged around the peripheral portion of the base member 52. These lugs are adapted to be engaged by the bottom of the trough and limit the tilting movements thereof.

A modification is shown in Figs. 6 to 9 wherein the annular member 56 is L-shaped in cross section. This annular member may be formed of transparent material such as glass or plastic. The annular member 56 provides a trough which includes a horizontal flange 57 and a generally vertical flange 58, to confine an aquatic animal such as a turtle 60 therein. The annular member is supported so that it may tilt and a plurality of arms 59 extend radially inward from the horizontal flange 57 and are connected at their inner ends to a bearing member 61. The bearing member 61 is similar to the member 29 and is provided with a conical cavity 62 in the lower end thereof. The bearing member 61 is supported on the pointed upper end of a stem 63. The apex angle of the conical cavity 62 is materially greater than the corresponding angle of the conical stem 63 so that the trough or annular member 56 may tilt on the stem 63 to various positions one of which is shown in Fig. 8 while its normal balanced position is illustrated in Fig. 6.

The stem 63 projects upwardly from a base 66 which has a relatively large plane under surface 67 so as to support the stem 63 in an upright position. A shallow bowl receptacle 68 is supported by the base 66 and the receptacle or aquarium is disc-shaped as shown in Figs. 6 and 8. The aquarium is preferably formed of transparent material and adapted to hold a small quantity of water in which a turtle or other aquatic animal may be accommodated. The periphery of the aquarium is provided with a generally horizontal lip 70 which terminates adjacent an inner edge of the horizontal flange 57 when the annular member 56 is in the untilted position.

The bearing member 61 carries a cylindrical shaped pin 69 which extends upwardly therefrom in alignment with the axis of the bearing member. An element representing a human being in a sitting position is shown at 71 and this part is similar to the element 36 of the first embodiment. A cylindrical shaped opening 72 is provided in the element 71 for receiving and supporting the fisherman on the pin 69. The fisherman element fits snugly on the pin 72 but is free to rotate thereon. An elongated rod 73 is supported at the inner end by the element 71 so that the appearance is provided of a fisherman holding a fishing pole. A flexible line 74 is secured to the free end of the pole 73 and carries a hook 76 at the lower end thereof. The legs 77 of the fisherman element and the pole 73 including the line 74 and the hook 76 are disposed laterally of the axis of the pin 69 so that the center of gravity of the fisherman and the associated parts is in the vicinity of the point 78 in Fig. 6. Thus in the absence of displacement of the annular member from the horizontal position the center of gravity is sufficiently near the axis of the pin 69 that the annular member assumes a substantially level position as shown in Fig. 6.

An aquatic creature such as a turtle represented at 60 often maneuvers in the water contained in the disc-shaped receptacle 68. If the turtle 60 crawls onto the flange 57 at approximately the nine o'clock position of the trough when considering Fig. 7 the annular member will tilt downwardly to a position as shown in Fig. 8. Further downward tilting of the trough beyond the position shown in Fig. 8 is prevented by means of one of the spokes or arms 59 engaging the top of the lip 70. Such tilting of the annular member 56 will shift the bearing member 61 from the position shown in Fig. 1 to a slightly inclined position illustrated in Fig. 8 whereby the pin 69 is tilted at an angle to the vertical. The fisherman element 71 then turns on the pin 69 until the center of gravity of this structure arrives in a lowermost position with the pole 73 in the radial alignment with the turtle 60. The hook 76 is then positioned over the aquatic animal to provide the illustion of attempts of the fisherman to snare the turtle. The turtle is confined to the trough by the upright flange 58 and as it moves around the annular member 56 the pole 73 and the hook swing with such tilting of the trough. The turtle or similar animal is at all times free to return to the receptacle 68.

The invention has been described with regard to several embodiments of the invention but it will be appreciated that changes may be made in the structural arrangement and the overall organization including the shape of the various parts. Such modifications and others may be made without departing from the spirit and scope of the invention as set forth in the appended claims.

What I claim and desire to secure by Letters Patent is:

1. An aquarium comprising, an annular shaped trough, a bearing member carried by a center of the trough, a vertically disposed stem having a pointed upper end engaging the bearing member and supporting the trough in a substantially horizontal position, a pin extending upwardly from the bearing member, an element representing a fisherman having an opening therein receiving said pin whereby the element may rotate on the pin, a fishing pole carried by said element extending radially therefrom to a position over the trough, and the center of gravity of said element being displaced from the axis of said pin in the radial direction of the pole.

2. An aquarium comprising, an annular shaped trough, a bearing member adjacent the center of the trough, means connecting the bearing member to the trough, a base member, a stem extending upwardly from the base member having a pointed upper end engaging the bearing member and supporting the trough in a substantially horizontal position, a cylindrical pin extending upwardly from the bearing member, an element representing a fisherman having a cylindrical shaped opening therein in which said pin extends, a fishing pole carried by said element extending radially therefrom terminating in a free end over the trough, and the center of gravity of said element being displaced from the axis of said pin towards the end of said pole.

3. An aquarium comprising, an annular shaped trough, a bearing member adjacent the center of the trough, means connecting the bearing member to the trough, a base member, a stem extending upwardly from the base member having a pointed upper end engaging the bearing member and supporting the trough in a substantially horizontal position, a cylindrical pin extending upwardly from the bearing member, an element representing a fisherman having a cylindrical shaped opening therein in which said pin extends, a fishing pole carried by said element extending radially therefrom terminating in a free end over the trough, the center of gravity of said element being displaced from the axis of said pin towards the end of said pole, and circumferentially spaced pins depending from the trough for engaging said base member to limit tilting of the trough.

4. An aquarium and an amusement device comprising, an annular member, a bearing member adjacent the axis of said annular member, means connecting the bearing member to said annular member, a base, a stem extending upwardly from the base having a pointed upper end engaging the bearing member and supporting the annular member in a substantially horizontal position, a cylindrical pin extending upwardly from the bearing member, an element representing a fisherman having a cylindrical shaped opening therein in which said pin extends, a fishing pole carried by said element extending radially therefrom terminating in a free end over said annular member, and the center of gravity of said element being displaced from the axis of said pin towards the end of said pole.

5. An aquarium and an amusement device comprising, an annular member, a bearing member adjacent the center of said annular member, means connecting the bearing member to said annular member, a base, a stem extending upwardly from the base having a pointed upper end engaging the bearing member and supporting the annular member in a substantially horizontal position, a cylindrical pin extending upwardly from the bearing member, an element representing a fisherman having a cylindrical shaped opening therein in which said pin extends, a fishing pole carried by said element extending radially therefrom terminating in a free end over said annular member, the center of gravity of said element being displaced from the axis of said pin towards the end of said pole, and means limiting the tilting of said member.

6. An aquarium and an amusement device comprising, an annular member including a lateral flange and an upright peripheral flange, a bearing member adjacent the center of said annular member, arms radiating from the bearing member supporting said annular member, a base, a disc-shaped receptacle supported by said base, a stem extending upwardly from the base through a central portion of the receptacle having a pointed upper end engaging the bearing member and supporting the annular member with the lateral flange in a substantially horizontal position, a cylindrical pin extending upwardly from the bearing member, an element representing a fisherman having a cylindrical shaped opening therein in which said pin extends, a fishing pole carried by said element extending radially therefrom terminating in a free end over said annular member, the center of gravity of said element being displaced from the axis of said pin towards the end of said pole, and said arms being positioned to engage the periphery of said receptacle and limit tilting of said annular member.

References Cited in the file of this patent

UNITED STATES PATENTS

| | | |
|---|---|---|
| 1,286,728 | O'Brien | Dec. 3, 1918 |
| 1,307,121 | Foster | June 17, 1919 |
| 1,517,202 | Engel | Nov. 25, 1924 |
| 1,891,012 | Raynor | Dec. 13, 1932 |

FOREIGN PATENTS

| | | |
|---|---|---|
| 92,748 | Germany | 1897 |